United States Patent
Suryanarayana et al.

(10) Patent No.: US 10,860,307 B2
(45) Date of Patent: Dec. 8, 2020

(54) FRAGMENTED FIRMWARE STORAGE SYSTEM AND METHOD THEREFOR

(71) Applicant: DELL PRODUCTS, LP, Round Rock, TX (US)

(72) Inventors: Shekar Babu Suryanarayana, Bangalore (IN); Anand P. Joshi, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/392,854

(22) Filed: Apr. 24, 2019

(65) Prior Publication Data

US 2020/0341744 A1    Oct. 29, 2020

(51) Int. Cl.
| | |
|---|---|
| *G06F 8/65* | (2018.01) |
| *G06F 21/57* | (2013.01) |
| *G06F 13/16* | (2006.01) |
| *G06F 13/42* | (2006.01) |
| *G06F 9/4401* | (2018.01) |

(52) U.S. Cl.
CPC .............. *G06F 8/65* (2013.01); *G06F 9/4411* (2013.01); *G06F 13/1668* (2013.01); *G06F 13/4282* (2013.01); *G06F 21/572* (2013.01); *G06F 2221/033* (2013.01)

(58) Field of Classification Search
CPC ...... G06F 8/65; G06F 9/4411; G06F 13/1668; G06F 13/4282; G06F 21/572
See application file for complete search history.

(56) References Cited

U.S. PATENT DOCUMENTS

| | | | |
|---|---|---|---|
| 7,676,666 B2 | 3/2010 | Lambert et al. | |
| 9,507,581 B2 | 11/2016 | Butcher et al. | |
| 9,672,047 B1* | 6/2017 | Deiderich, III | ..... G06F 16/1847 |
| 2011/0004871 A1* | 1/2011 | Liu | .......................... G06F 8/65 |
| | | | 717/173 |
| 2014/0130034 A1 | 5/2014 | Subbu et al. | |
| 2015/0026378 A1 | 1/2015 | Brundridge et al. | |
| 2016/0154820 A1 | 6/2016 | Singh et al. | |
| 2016/0202964 A1 | 7/2016 | Butcher et al. | |
| 2016/0210769 A1 | 7/2016 | Suryanarayana et al. | |
| 2017/0357500 A1 | 12/2017 | Vidhadhara et al. | |
| 2019/0235853 A1* | 8/2019 | Li | ............................. G06F 8/65 |
| 2020/0097274 A1* | 3/2020 | Sarkar | ................... G06F 9/4416 |

OTHER PUBLICATIONS

A System and Method of Policy-Based Autonomous Firmware Update, IP.com, May 3, 2012, retrieved online on Sep. 29, 2020, pp. 1-14. Retrieved from the Internet: <URL: https://priorart.ip.com/IPCOM/000217115>. (Year: 2012).*

* cited by examiner

*Primary Examiner* — Hanh Thi-Minh Bui
(74) *Attorney, Agent, or Firm* — Larson Newman, LLP (57) ABSTRACT

A method includes providing a runtime service to receive a payload containing a basic input-output system (BIOS) image and to generate a firmware storage policy. The firmware storage policy identifies a data storage device to store first firmware instructions of the BIOS image, and identifies another data storage device to store second firmware instructions of the BIOS image. The method further includes providing a boot service to store the BIOS image according to the firmware storage policy.

18 Claims, 5 Drawing Sheets

FRAGMENTED FIRMWARE STORAGE SYSTEM AND METHOD THEREFOR

FIELD OF THE DISCLOSURE

This disclosure generally relates to information handling systems, and more particularly relates to a fragmented firmware storage at an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include providing a runtime service to receive a payload containing a basic input-output system (BIOS) image and to generate a firmware storage policy. The firmware storage policy identifies a data storage device to store first firmware instructions of the BIOS image, and identifies another data storage device to store second firmware instructions of the BIOS image. The method further includes providing a boot service to store the BIOS image according to the firmware storage policy.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

An information handling system typically includes a basic input/output system (BIOS) that is responsible for initializing hardware components and subsystems and to load an operating system during a startup process of the system. The BIOS is typically stored at a non-volatile memory device, for example a flash memory device. An information handling system is usually delivered to a customer with an initial version of the BIOS already installed at the flash memory device. During the lifetime of the information handling system, it may become necessary or advisable to update the BIOS with a new version having one or more firmware revisions. The update procedure is often referred to as flashing the BIOS. For example, a user may download a program that includes a payload containing a complete BIOS image. When executed, the update program can initiate a re-boot of the information handling system, and the new BIOS image can be installed. A complete BIOS image is typically stored at single flash device referred to as a Serial Peripheral Interface flash memory device. FIGS. 1-5 illustrate techniques for providing additional storage locations to store portions of a BIOS image at an information handling system.

Figure 1:
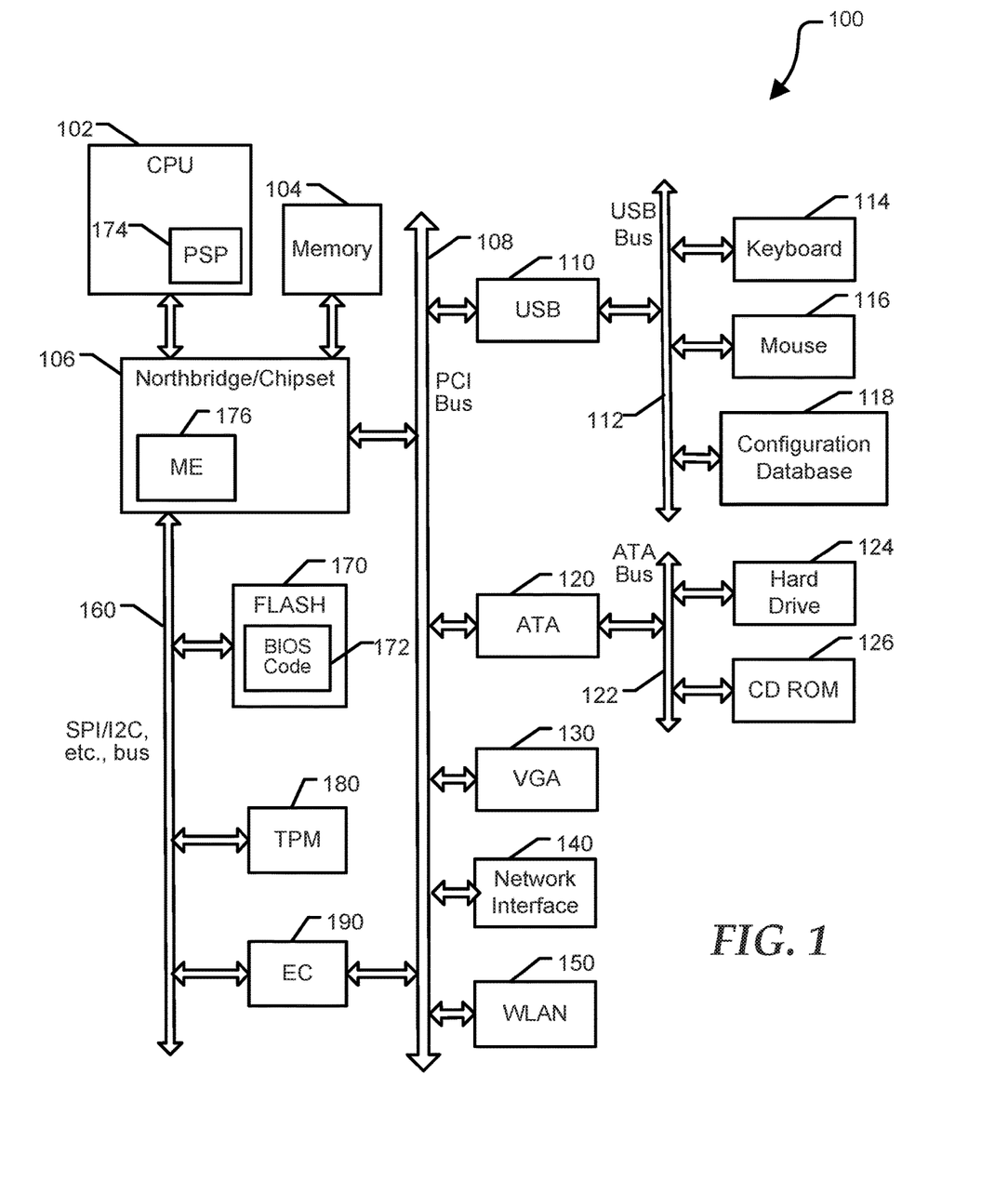
FIG. 1 is a block diagram of an information handling system according to an embodiment of the present disclosure.

FIG. 1 illustrates an information handling system 100 including a processor 102, a memory 104, a chipset 106, a PCI bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a flash memory device 170 for storing BIOS code 172, a trusted platform module (TPM) 180, and a baseboard management controller (EC) 190. EC 190 can be referred to as a service processor, and embedded controller, and the like. Flash memory device 170 can be referred to as a SPI flash device, BIOS non-volatile random access memory (NVRAM), and the like. EC 190 is configured to provide out-of-band access to devices at information handling system 100. As used herein, out-of-band access herein refers to operations performed without support of CPU 102, such as prior to execution of BIOS code 172 by processor 102 to initialize operation of system 100. In an embodiment, system 100 can further include a platform security processor (PSP) 174 and/or a management engine (ME) 176. In particular, an x86 processor provided by AMD can include PSP 174, while ME 176 is typically associated with systems based on Intel x86 processors.

PSP 174 and ME 176 are processors that can operate independently of core processors at CPU 102, and that can execute firmware prior to the execution of the BIOS by a primary CPU core processor. PSP 174, included in recent AMD-based systems, is a microcontroller that includes dedicated read-only memory (ROM) and static random access memory (SRAM). PSP 174 is an isolated processor that runs independently from the main CPU processor cores. PSP 174 has access to firmware stored at flash memory device 170. During the earliest stages of initialization of system 100, PSP 174 is configured to authenticate the first block of BIOS code stored at flash memory device 170 before releasing the x86 processor from reset. Accordingly, PSP 174 provides a hardware root of trust for system 100. ME 176 provides similar functionality in Intel-based systems. In another embodiment, EC 190 can provide aspects of a hardware root of trust. The root of trust relates to software processes and/or hardware devices that ensure that firmware and other software necessary for operation of an information handling system is operating as expected.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of chipset 106 can be integrated within CPU 102. In an embodiment, chipset 106 can include a platform controller hub (PCH). System 100 can include additional buses and bus protocols, for example I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS code 172 can be referred to as a firmware image, and the term BIOS is herein used interchangeably with the term firmware image, or simply firmware. In an embodiment, BIOS 172 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

BIOS code 172 includes instructions executable by CPU 102 to initialize and test the hardware components of system 100, and to load a boot loader or an operating system (OS) from a mass storage device, BIOS code 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

The storage capacity of SPI flash device 170 is typically limited to 32 MB or 64 MB of data. However, original equipment manufacturers (OEMs) of information handling Systems may desire to provide advanced firmware capabilities, resulting in a BIOS image that is too large to fit in SPI flash device 170. Information handling system can include other non-volatile flash memory devices, in addition to SPI flash device 170. For example, memory 104 can include non-volatile memory devices in addition to dynamic random access memory devices. Such memory is referred to herein as non-volatile dual in-line memory module (NVDIMM) devices. In addition, hard drive 124 can include non-volatile storage elements, referred to as a solid state drive (SSD). For still another example, information handling system 100 can include one or more non-volatile memory express (NVMe) devices. Techniques disclosed herein provide for storing a portion of a BIOS image at one or more non-volatile memory devices in addition to SPI flash device 170.

Figure 2:
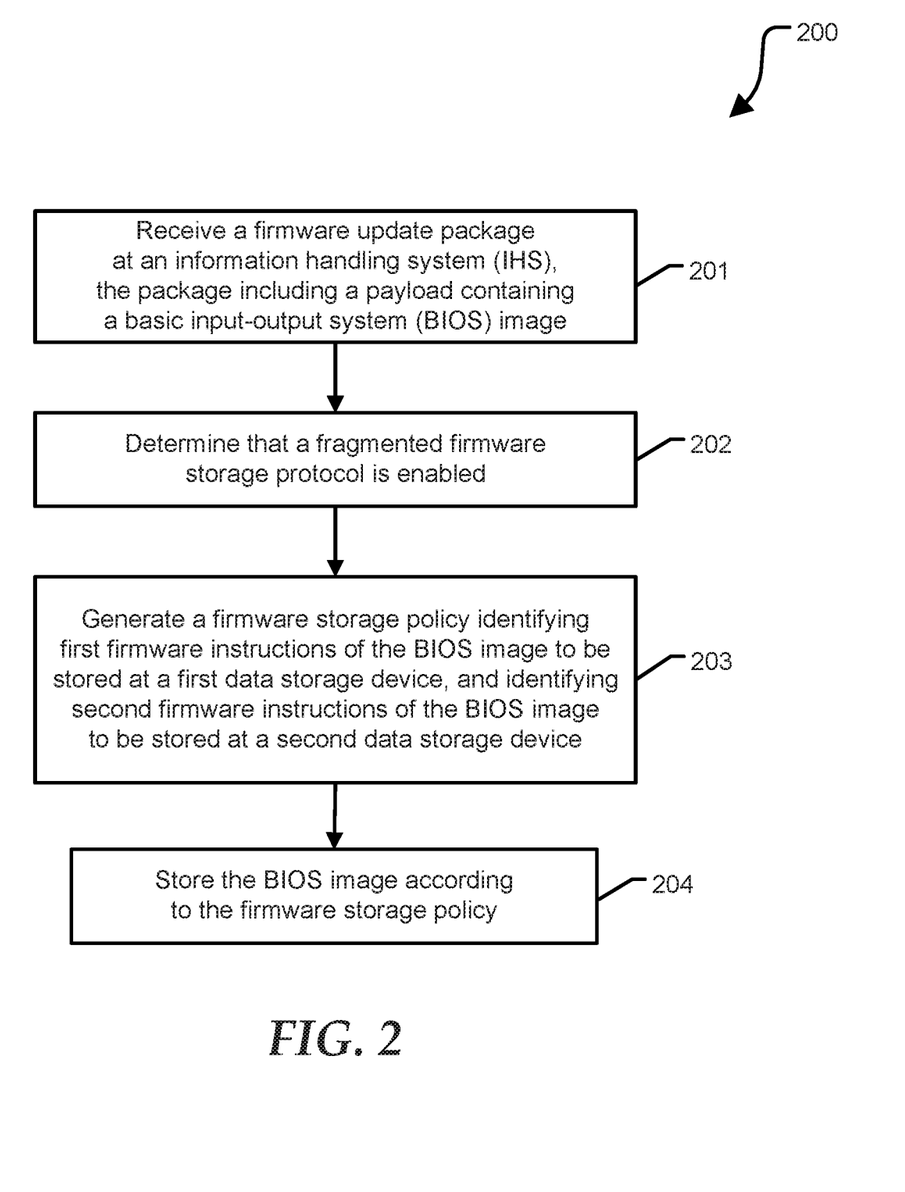
FIG. 2 is a flow diagram illustrating a method for updating firmware at an information handling system according to a specific embodiment of the present disclosure.

FIG. 2 shows a method 200 for updating a firmware at an information handling system according to a specific embodiment of the present disclosure. Method 200 begins at block 201 where a firmware update package is received at an information handling system, the package including a payload containing a new BIOS image. For example, a Windows Update server or similar update administration service can host the firmware update package and facilitate dissemination of the update package to one or more information handling systems. Alternatively, a user of the information handling system may download the firmware update package from an original equipment provider or the like, and a BIOS update can be initiated when the package is executed. The payload containing the new BIOS can be authenticated, for example using a digital signature. As used herein, the term BIOS image can include primary platform initialization firmware as well as firmware associated with other platform devices. The payload can be stored at a memory, for example memory 104, an Extensible Firmware Interface system partition (ESP), and the like. An ESP is an EFI-compliant partition included at a hard drive or another storage medium that is reserved for use by an original equipment manufacturer. The ESP may store an EFI boot loader, applications used by the firmware during startup, diagnostic routines, system logs, and the like.

Method 200 continues at block 202 where it is determined whether a fragmented firmware storage protocol is enabled. As used herein, the term fragmented storage is used to describe partitioning a BIOS image into two or more portions; each portion stored at physically disparate non-volatile memory devices. BIOS 172 at information handling system 100 can provide a BIOS configuration setup interface where a user can select from available configuration options. In an embodiment, the configuration setup interface can provide an option to enable or disable fragmented storage of a BIOS image, identify one or more alternative firmware storage devices, and define a size and location of each of the alternative storage device partitions that is available for storing a portion of the BIOS image.

Method 200 continues at block 203 where a firmware storage policy is generated, the policy identifying storage locations for specific firmware volumes or EFI files. The firmware storage policy can include information identifying whether fragmented storage has been enabled at the configuration setup interface, information identifying one or more additional devices that can be used to store portions of the BIOS image, and information specifying a storage capacity of each of the additional storage locations. Each storage location can be identified by a UEFI device path and address offsets.

In an embodiment, the firmware storage policy can be updated by a runtime service, such as an Advanced Configuration and Power interface (ACPI) service defined during initialization of information handling system 100. The ACPI service, referred to herein as a Fragment Firmware Payload Protocol (FFPP), can be triggered in response to executing a BIOS update package during runtime. In an embodiment the ACPI service can be associated with a virtual ACPI device and a corresponding ACPI device ID. A driver can be associated with the virtual ACPI device, referred to herein as an FFPP handler. In particular, an ACPI table carries the index to the FFPP handler, and the handler is provided at service tables. The tables are constructed during boot time and handed over to the runtime operating system, stored at an ACPI mapped area of memory 104.

During operation, the FFPP handler can be configured identify individual firmware volumes and EFI files included in the BIOS image. An EFI file is an executable, for example an EFI Application, and EFI Driver, and the like. In an embodiment, a firmware volume can include multiple EFI files, and a single firmware volume can be fragmented (split) for storage at multiple storage devices, whereas an EFI file is not fragmented. The FFPP handler can determine how to fragment the BIOS image based on the firmware storage policy and based on information included at the firmware update package and/or the included update payload. The split payload information is updated in a firmware flash layout header so that the split payload can be located from the header. For example, the FFPP handler can determine that a first portion of a the BIOS image is to be stored at SPI flash device 170, a second portion of the BIOS image to be stored at a location in an NVDIMM device, a third portion of the BIOS image to be stored at an SSD, and the like. In an embodiment, the FFPP handler can generate an updated firmware storage policy that includes information describing how the BIOS image is split across the multiple storage locations.

Method 200 completes at block 204, where a re-boot of information handling system 100 can be initiated after the FFPP handler has split the update image payload. A boot service, referred to herein as a Fragmented Firmware Payload Manager Protocol (FFPMP) can determine that an update-pending flag is set, assertion of the flag indicating that an updated BIOS image is pending. The FFPMP can read information generated by the FFPP handler that identifies where individual portions of the BIOS image are to be stored. Individual update jobs can be initiated to update each of the additional storage locations. The master header in SPI flash device 170 is updated to include indexes and offsets identifying where each firmware volume and EFI file is stored. In an embodiment, the FFPMP can store the updated firmware storage policy at SPI flash device 170. The updated firmware storage policy includes the original configuration information provided by the user at the configuration setup interface. Once all portions of the BIOS image have been stored at their respective locations, information handling system 100 can once again be rebooted, this time using the newly updated BIOS image, and only then is control of system 100 transferred to an operating system, for example Windows.

Figure 3:
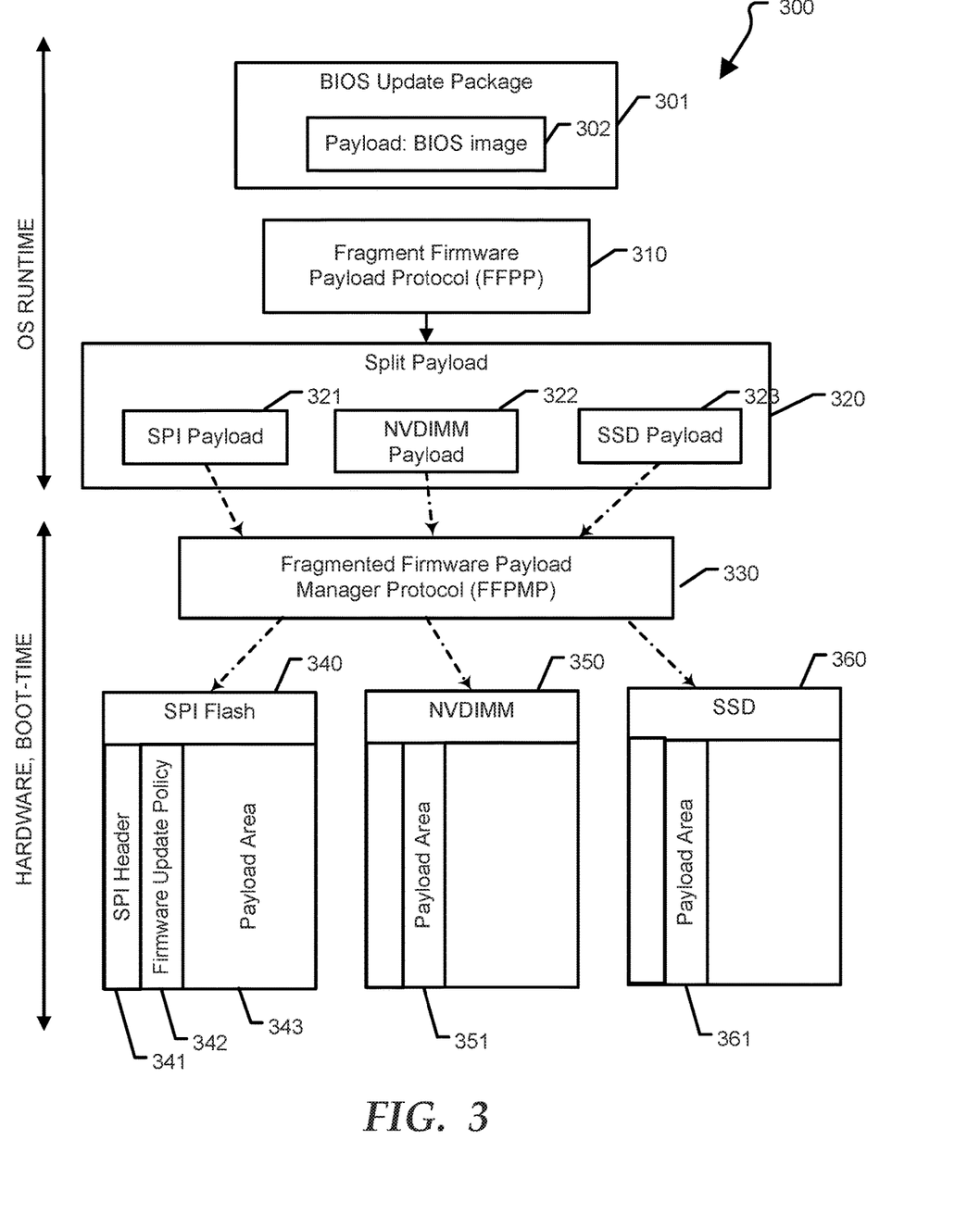
FIG. 3 is a block diagram providing a graphical representation of the method of FIG. 2, according to a specific embodiment of the present disclosure.

Method 200 may be better understood with reference to FIG. 3 that provides a graphical representation 300 of the method. Graphic 300 includes a BIOS update package 301 that includes a payload 302 containing a complete BIOS image, a FFPP 310 to parse BIOS image payload 302 to identify included firmware volumes and EFIs and to generate split payload 320 as described above with reference to block 203 of FIG. 2. Split payload 320 includes a payload 321 including firmware to be stored at SPI flash device 170, a payload 322 including firmware to be stored at a NVDIMM device, and payload 323 including firmware to be stored at an SSD device. While three storage devices are illustrated, one of skill will appreciate that the multi-store techniques disclosed herein can utilize one or more storage devices in addition to SPI flash device 170.

Graphic 300 further includes hardware devices for storing a respective split payload, including a SPI flash device 340, NVDIMM 350, and SSD 360. SPI flash device 340 includes a SPI header 341, a partition for storing firmware update policy 342, and a partition 343 for storing a SPI payload 321. NVDIMM 350 includes a partition 351 for storing NVDIMM payload 322, and SSD 360 includes a partition 361 for storing payload SSD payload 323. During boot time, FFPMP 330 is configured to update firmware at each of storage devices 330, 340, and 350 as described above with reference to block 204 of FIG. 2.

Figure 4:
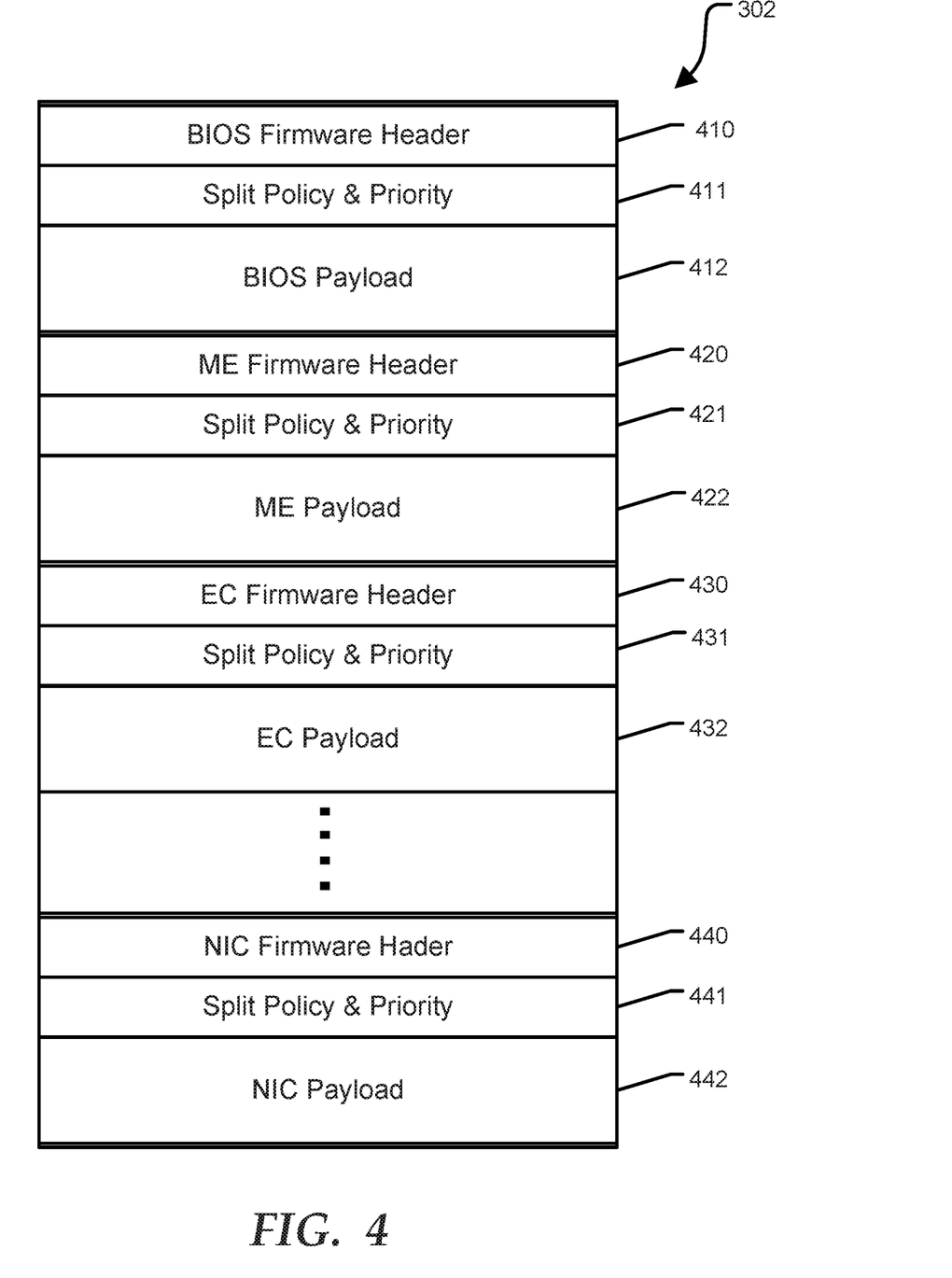
FIG. 4 is a block diagram illustrating a BIOS image payload according to a specific embodiment of the present disclosure.

FIG. 4 shows BIOS image payload 302 of FIG. 3 according to a specific embodiment of the present disclosure. Payload 302 can include multiple firmware components, including the primary platform BIOS firmware in addition to firmware corresponding to ME 176, EC 190, NIC 140, and the like. BIOS firmware can include a header 410, split policy and priority information 411, and a BIOS payload 412. ME firmware can include a header 420, split policy and priority information 421, and a ME payload 422; EC firmware can include a header 430, split policy and priority information 431, and a ME payload 422; and NIC firmware can include a header 430, split policy and priority information 431, and a NIC payload 432. In an embodiment, FFPP 310 can retrieve split policies 411, 421, 431, and 441 from payload 320, along with firmware update policy 332 to facilitate determining storage policies for corresponding firmware volumes and EFI files. For example, platform initialization firmware, including initial boot block instructions needs to be stored on SPI flash device 170. Similarly, drivers that are responsible for initializing critical platform infrastructure, for example firmware to initialize other platform devices that provide extended firmware storage must be executed before firmware stored on these devices can be retrieved. The split policies may further identify which firmware volumes can be fragmented across two or more storage devices, which EFI files can be stored in extended storage, and the like. In general, the split policy and priority information is decided based on boot criticality of the particular firmware volumes or EFI files at boot time.

During operation, FFPP 310 can split payload 320 and individual firmware components by marking respective firmware volumes and EFI files as extended payloads. FFPP 310 can create a table in each firmware component to describe which firmware volumes and which EFI files are to be stored at SPI flash device 170, and which are to be stored at an extended storage location. In addition, FFPP 310 can generate information) identifying how boot services can locate and fetch each firmware item to support updating of each firmware item at its respective storage location and loading of each firmware item during subsequent boot events at information handling system 100. In an embodiment, FFPP 310 can generate a new firmware update policy 332 and store the policy at SPI flash device 170 during the update procedure so that the FFPMP and pre-boot loaders can locate the firmware volumes and EFI files. In particular, the FFPMP 330 is configured to perform the update of all fragmented images into their respective storage areas, and publish a protocol to facilitate access during boot time.

Figure 5:
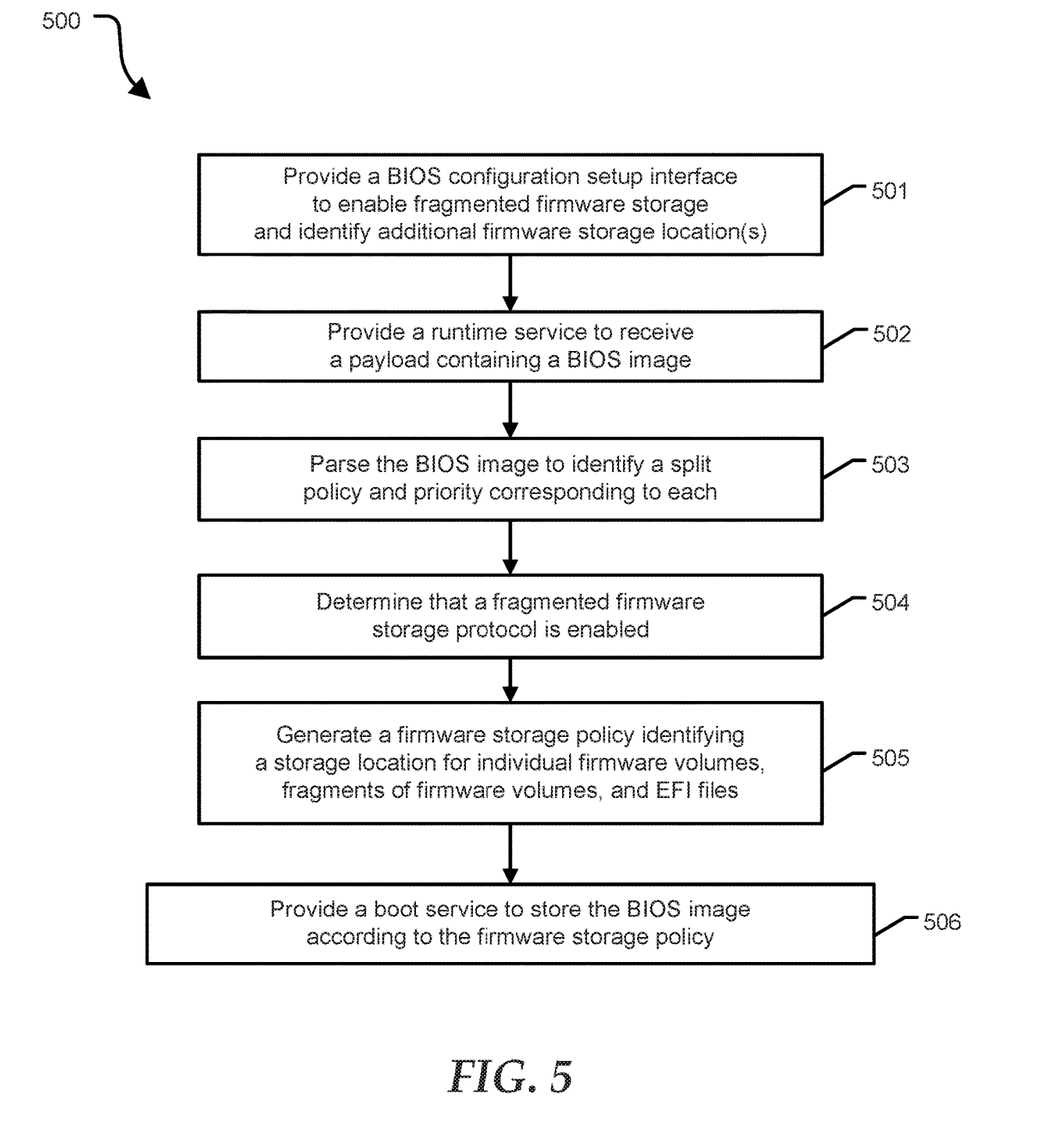
FIG. 5 is a flow diagram illustrating a method for updating firmware at an information handling system according to another embodiment of the present disclosure.

FIG. 5 is a flow diagram illustrating a method 500 for updating firmware at an information handling system according to another embodiment of the present disclosure. Method 500 illustrates the use of runtime services, including FFPP 310, and boot services, including FFPMP 330. Method 500 begins at block 501 where a 13105 configuration setup interface can be employed by a user or system administration resource to enable/disable fragmented firmware storage and to identify one or more additional firmware storage locations. Method 500 continues at block 502 where a runtime service such as FFPP 310 is provided to receive a payload containing a BIOS image from a firmware update package. At block 503, the BIOS image is parsed to identify split policy and priority information corresponding to each firmware component, such as firmware associated with BIOS, ME, EC and NIC as illustrated at FIG. 4. At block 504, it is determined that a fragmented firmware storage protocol is enabled, based on the configuration setup options specified at block 501. At block 505, a firmware storage policy is generated, the policy identifying a storage location for individual firmware volumes, fragments of firmware volumes, and EFI files. Method 500 completes at block 506 where a re-boot of information handling system is initiated and a boot service such as FFPMP 330 is provided to store the BIOS image according to the firmware storage policy. Subsequent initialization of information handling system 100 will utilize the updated firmware stored at NVRAM flash device 170 and firmware stored at one or more alternative storage locations.

Referring back to FIG. 1, the information handling system 100 can include a set of instructions that can be executed to cause the information handling system to perform any) one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium; the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.)

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving a firmware update package at an information handling system (IHS), the package including a payload containing a basic input-output system (BIOS) image;
   in response to executing the firmware update package and determining that a fragmented firmware storage protocol is enabled, generating a firmware storage policy identifying first firmware instructions of the BIOS image to be stored at a first non-volatile data storage device, and identifying second firmware instructions of the BIOS image to be stored at a second non-volatile data storage device;
   invoking an initialization procedure at the IHS;
   determining that a firmware update flag is asserted; and
   storing the first firmware instructions at the first non-volatile data storage device, and
   storing the second firmware instructions at the second non-volatile data storage device according to the firmware storage policy.

2. The method of claim 1, wherein the first nonvolatile data storage device is a Serial Peripheral Interface (SPI) flash memory device that is configured to store initial boot block firmware instructions, and further comprising storing the firmware storage policy at the SPI flash memory device.

3. The method of claim 1, further comprising storing the payload at a third non-volatile data storage device accessible during initialization of the information handling system.

4. The method of claim 1, wherein the first non-volatile data storage device is a Serial Peripheral Interface (SPI) flash memory device that is configured to store initial boot block firmware instructions.

5. The method of claim 4, wherein the second non-volatile data storage device is not the SPI flash memory device.

6. The method of claim 1, further comprising:
   providing a BIOS configuration setup interface accessible during initialization of the IHS; and
   providing, at the BIOS configuration setup interface, configuration options to:
      enable the fragmented firmware storage protocol;
      identify the second non-volatile data storage device; and
      specify a size of a region at the second non-volatile data storage device available for storing the second firmware instructions.

7. The method of claim 1, further comprising providing an Advanced Configuration and Power Interface (ACPI) service during initialization of the IHS, the ACPI service configured to generate the firmware storage policy in response to execution of the firmware update package at the IHS.

8. The method of claim 1, further comprising:
   parsing the firmware update package to identify a first firmware component, the first firmware component including information identifying a fragmenting policy corresponding to the first firmware component; and
   generating the firmware storage policy based on the parsed information.

9. An information handling system (IHS) comprising:
   a central processing unit (CPU);
   a Serial Peripheral Interface (SPI) flash memory device configured to store initial boot block firmware instructions;
   a second flash memory device; and
   a system memory device to store program instructions executable by the CPU to:
      receive a firmware update package at the IHS, the package including a payload containing a basic input-output system (BIOS) image;
      in response to executing the firmware update package and determining that a fragmented firmware storage protocol is enabled, generate a firmware storage policy identifying first firmware instructions of the BIOS image to be stored at SPI flash memory device, and identifying second firmware instructions of the BIOS image to be stored at a second flash memory device;
      invoke an initialization procedure at the IHS; determine that a firmware update flag is asserted; and
      store the first firmware instructions at the SPI flash memory device, and storing the second firmware instructions at the second flash memory device according to the firmware storage policy.

10. The information handling system of claim 9, the program instructions further to store the firmware storage policy at the SPI flash memory device.

11. The information handling system of claim 9, the program instructions further to store the payload at the system memory device.

12. The information handling system of claim 9, the first firmware instructions to:
provide a BIOS configuration setup interface accessible during initialization of the IHS; and
provide, at the BIOS configuration setup interface, configuration options to:
enable the fragmented firmware storage protocol;
identify the second flash memory device; and
specify a size of a region at the second flash memory device available for storing the second firmware instructions.

13. The information handling system of claim 9, the first firmware instructions to provide an Advanced Configuration and Power Interface (ACPI) service during initialization of the IHS, the ACPI service configured to generate the firmware storage policy in response to execution of the firmware update package at the IHS.

14. The information handling system of claim 9, the first firmware instructions to
parse the firmware update package to identify a first firmware component, the first firmware component including information identifying a fragmenting policy corresponding to the first firmware component; and
generate the firmware storage policy based on the parsed information.

15. A method comprising:
providing a runtime service to:
receive a payload containing a basic input-output system (BIOS) image; and
generate a firmware storage policy identifying first firmware instructions of the BIOS image to be stored at a first non-volatile data storage device, and identifying second firmware instructions of the BIOS image to be stored at a second non-volatile data storage device; and
providing a boot service to:
determine that a firmware update flag is asserted; and
store the first firmware instructions at the first non-volatile data storage device and store the second firmware instructions at the second non-volatile data storage device according to the firmware storage policy.

16. The method of claim 15, wherein the first non-volatile data storage device is a Serial Peripheral Interface (SPI) flash memory device that is configured to store initial boot block firmware instructions, and wherein the second non-volatile data storage device is not the SPI flash memory device.

17. The method of claim 15, wherein the boot service is further to:
provide a BIOS configuration setup interface accessible during initialization of the IHS; and
provide, at the BIOS configuration setup interface, configuration options to:
enable the fragmented firmware storage protocol;
identify the second non-volatile data storage device; and
specify a size of a region at the second non-volatile data storage device available for storing the second firmware instructions.

18. The method of claim 15, wherein the runtime service is further to:
parse the firmware update package to identify a first firmware component, the first firmware component including information identifying a fragmenting policy corresponding to the first firmware component; and
generate the firmware storage policy based on the parsed information.

* * * * *